United States Patent
Roa-Espinosa et al.

(10) Patent No.: US 9,956,563 B1
(45) Date of Patent: May 1, 2018

(54) SEPARATION OF CLEAN WATER FROM EFFLUENT STREAMS

(71) Applicants: Aicardo Roa-Espinosa, Madison, WI (US); Samuel William Roa-Lauby, Madison, WI (US); Kim Huong Pham, Belleville, WI (US); Joaquin Camilo Perez-Mahecha, Madison, WI (US)

(72) Inventors: Aicardo Roa-Espinosa, Madison, WI (US); Samuel William Roa-Lauby, Madison, WI (US); Kim Huong Pham, Belleville, WI (US); Joaquin Camilo Perez-Mahecha, Madison, WI (US)

(*) Notice: Subject to any disclaimer, the term of this patent is extended or adjusted under 35 U.S.C. 154(b) by 0 days. days.

(21) Appl. No.: 15/789,996

(22) Filed: Oct. 21, 2017

(51) Int. Cl.
| | |
|---|---|
| B01D 61/02 | (2006.01) |
| B01D 17/04 | (2006.01) |
| C02F 1/52 | (2006.01) |
| B01D 21/01 | (2006.01) |
| C02F 9/00 | (2006.01) |
| B03D 1/00 | (2006.01) |
| B03D 1/14 | (2006.01) |
| C02F 1/44 | (2006.01) |
| B03D 1/016 | (2006.01) |
| B03D 3/06 | (2006.01) |
| B01D 21/02 | (2006.01) |
| B01F 17/00 | (2006.01) |
| C02F 1/56 | (2006.01) |
| C02F 11/12 | (2006.01) |
| B01D 61/04 | (2006.01) |
| B01D 61/00 | (2006.01) |
| B01D 21/00 | (2006.01) |

(Continued)

(52) U.S. Cl.
CPC .......... *B03D 1/016* (2013.01); *B01D 17/047* (2013.01); *B01D 21/01* (2013.01); *B01D 21/02* (2013.01); *B01D 61/04* (2013.01); *B01F 17/0028* (2013.01); *B03D 3/06* (2013.01); *C02F 1/441* (2013.01); *C02F 1/56* (2013.01); *C02F 11/125* (2013.01); *B01D 21/00* (2013.01); *B01D 33/64* (2013.01); *B01D 2201/14* (2013.01); *B03D 2201/00* (2013.01); *B03D 2201/002* (2013.01); *B03D 2201/007* (2013.01)

(58) Field of Classification Search
None
See application file for complete search history.

(56) References Cited

U.S. PATENT DOCUMENTS

| | | | |
|---|---|---|---|
| 2005/0258103 A1* | 11/2005 | Cort | B03C 1/015 210/695 |
| 2008/0035577 A1* | 2/2008 | Brook-Levinson | C02F 1/008 210/667 |

(Continued)

*Primary Examiner* — Clare M Perrin
(74) *Attorney, Agent, or Firm* — Steven H. Greenfield; Greenfield Invention and Patent Consulting, Inc.

(57) ABSTRACT

A process for separating clean water which has an impurities content of less than 100 ppm from waste materials such as farm manure is disclosed. In a first step, a plate separator splits the waste material stream into a first effluent fraction and a first solids fraction. The first solids fraction then undergoes two stages of pressing to increase the solids contents to about 30 to 40 percent which makes it suitable for granulation or pelletizing. The first effluent fraction is treated in successive stages with various chemical agents resulting in the removal of most of the solids and inorganic impurities from the effluent to achieve drinkable water purity.

15 Claims, 1 Drawing Sheet

(51) Int. Cl.
  *C02F 1/00* (2006.01)
  *B03D 3/00* (2006.01)
  *B01D 37/00* (2006.01)
  *B03B 5/60* (2006.01)
  *B03B 5/64* (2006.01)
  *B01D 33/64* (2006.01)

(56) References Cited

U.S. PATENT DOCUMENTS

2009/0056940 A1* 3/2009 Minnich ................ B01D 17/02
  166/266
2011/0147316 A1* 6/2011 Polizzotti .............. C02F 1/5263
  210/705

* cited by examiner

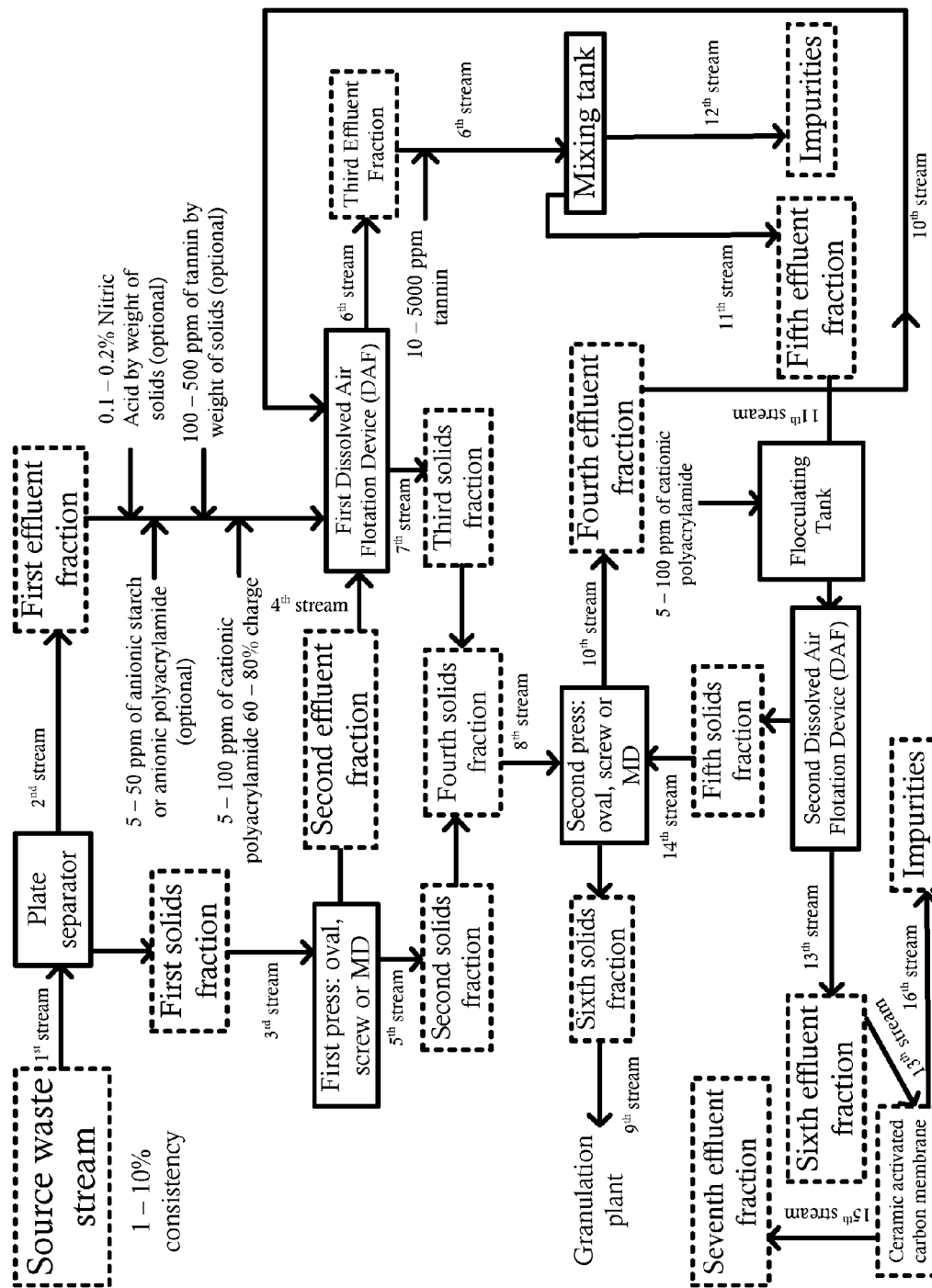

SEPARATION OF CLEAN WATER FROM EFFLUENT STREAMS

FIELD OF THE INVENTION

The present invention relates generally to a process of clean water from an effluent stream that contains materials and contaminants that make this water unusable for agricultural purposes or for drinking. More specifically, the present invention relates to a process to generate clean water from raw or digested manure originating from farm waste.

BACKGROUND OF THE INVENTION

Waste materials from various sources contain blends of oils, grease, protein, fibers, minerals and water at varying percentages. Examples include: grease trap materials, wood processing byproducts, animal processing waste such as animal blood and animal meat originating from slaughterhouses, and animal manure that originates from farms. The waste byproducts contain valuable components that have beneficial uses if recovered from these waste materials. Biomass materials may be used as animal feed, minerals may be used in fertilizers, and lignin, which is a component of wood, may be used as a binder, an emulsifier or a dispersant. Additionally, these waste streams contain large amount of water that, if recovered, has a variety of uses including irrigation and drinking.

In most cases, large solids are separated from waste material streams by means of screens, such as a screw press or a multidisc press. In subsequent steps, additional insoluble materials may be separated from the water through air floatation devices, clarifiers or settling lagoons. Most such processes however, leave an effluent stream that contains between from about 1.5% to about 4%, which cannot be removed from the water economically by conventional processes.

It would therefore be desirable to provide a process to separate these residual solid materials from effluent stream that would provide a drinkable water stream and recycle the solid materials for beneficial uses such as fertilizers.

SUMMARY OF THE PRESENT INVENTION

It is the object of the present invention to separate out the non-aqueous material content from the effluent water such that its remaining non-aqueous material content is less than 100 ppm.

In an aspect of the present invention, a process for separating water from a source stream containing water and non-aqueous matter, said process comprising: passing the source stream through a plate separator producing a first solids fraction and a first effluent fraction; passing the first solids fraction through a first press producing a second solids fraction and a second effluent fraction; passing the first effluent fraction into a first dissolved air flotation device, wherein the first effluent fraction is separated into a third solids fraction and a third effluent fraction, wherein separating the first effluent fraction into the third solids fraction and the third effluent fraction is accomplished by treating the first effluent fraction with acrylamide/Ethanaminium, N,N,N-trimethyl-2-((1-oxo-2-propenyl)oxo)-, chloride copolymer at about 5 ppm to 100 ppm by weight of the first effluent fraction; and combining the second solids fraction stream with the third solids fraction stream to produce a fourth solids fraction stream.

BRIEF DESCRIPTION OF THE DRAWINGS

FIG. 1 is a schematic of the process according to an embodiment of the present invention.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention.

The process schematic is provided in FIG. 1. The present invention consists of a multistage process for separating water from waste products including but not limited to raw or digested manure originating from animal farms.

In a first step, a waste source stream (labeled in FIG. 1 as the $1^{st}$ stream) having a consistency in the range of about 1% to 10% is passed through a plate separator which splits the source stream into a first solids fraction (third stream) and a first effluent fraction (second stream).

In successive steps, the first solids fraction is concentrated using presses to achieve about 30 to 40% consistency while solids are successively removed by various chemical treatments from the first effluent fraction to achieve a clean water stream having a solids or dissolved impurity level of less than 100 ppm. The solids contain valuable materials for various uses such as animal feed and fertilizers while the water containing low impurities may be used for a variety of purposes including drinking. The solids level of 30-40% is sufficiently high to be pelletized or granulated, which are useful form for such uses.

The first effluent fraction is fed into a first Dissolved Air Flotation Device (DAF) through a pipe having multiple inlet ports that are spaced about 15 seconds apart based on the average flow rate of the first effluent fraction through the pipe. The essential chemical treatment added to the first effluent fraction through the pipe is between about 5 to about 100 ppm by weight of the first effluent fraction of a cationic polyacrylamide. Optionally, the first effluent fraction is also treated with nitric acid for the purpose of buffering the carbonates in the first effluent fraction which facilitates their removal as impurities. If the source stream consists of raw manure, the buffer pH is about 7.0-7.25, while the buffer pH for digested manure is 7.25-7.5. To achieve the pH targets, about 0.1 to 0.2% by weight of solids of nitric acid are typically required; however, the amounts may need to be adjusted depending on the pH of the source stream. The nitric acid is added at a first chemical addition inlet in a pipe leading to the first dissolved air flotation device. The buffered first effluent fraction may then be treated with about 100 to 500 ppm by weight of a demulsifier. The preferred demulsifier is tannin; however other demulsifiers fall within the scope of the present invention. The tannin is added about 30 seconds downstream of the nitric acid addition port. Anionic starch at a rate of about 5 to 50 ppm by weight is optionally added to the pipe about 15 seconds downstream of the nitric acid addition port. The starch helps precipitate out solids from the first effluent fraction. In lieu of the starch, an anionic polyacrylamide at an addition rate of between about 5 to 50 ppm by weight may be used. The preferred cationic polyacrylamide for treating the first effluent fraction is Cationic Polyacrylamide Copolymer in the form of ADMAEA.

Following the chemical treatments, the first effluent fraction is fed into the first dissolved air flotation device (DAF)

which separates the first effluent fraction ($2^{nd}$ stream) into the third solids fraction ($7^{th}$ stream) and the third effluent fraction ($6^{th}$ stream). The third effluent fraction ($6^{th}$ stream) may further be treated with about 100 to 5000 ppm by weight of a demulsifier such as tannin in a mixing tank using vigorous mixing. This chemical treatment precipitates non-aqueous impurities ($12^{th}$ stream) out of the third effluent fraction ($6^{th}$ stream) to yield a fifth effluent fraction ($11^{th}$ stream) that has percent solids in the range of about 0.5% to 2%. The impurities stream ($12^{th}$ stream) may contain high levels of phosphates, nitrogen and potassium. The $11^{th}$ stream may contain acceptable COD and BOD levels for some uses. However, under certain circumstances, such as a high load of impurities present in the raw manure, or an inefficient removal of the impurities in the first dissolved air flotation device, the COD and BOD levels may be excessive. If so, the fifth effluent fraction ($11^{th}$ stream) may be further processed in a second dissolved air flotation device as shown in FIG. 1. To accomplish this, the fifth effluent fraction ($11^{th}$ stream) is treated with between about 5 to 100 ppm of cationic polyacrylamide, such as ADMAEA, by weight of the fifth effluent fraction. This treatment may be accomplished in a flocculating tank where the polyacrylamide is mixed in with the $11^{th}$ stream.

The treatment in the second dissolved air flotation device further separates out a fifth solids fraction ($14^{th}$ stream) and a sixth effluent fraction ($13^{th}$ stream). The sixth effluent fraction ($13^{th}$ stream) has a low level of impurities that may be further reduced by a reverse osmosis process accomplished by passing it through a ceramic activated carbon membrane or another type of membrane to achieve a level of solids that is less than 100 ppm and sufficiently low COD/BOD levels for discharge into municipal water systems and may be used as drinking water. The passage of the sixth effluent fraction through the ceramic activated carbon membrane generates a seventh effluent fraction ($15^{th}$ stream) which constitutes clean and drinkable water and an impurities stream removed in the reverse osmosis process ($16^{th}$ stream).

As depicted in FIG. 1, the separation of the non-aqueous impurities ($12^{th}$ stream) from the treated third effluent fraction ($6^{th}$ stream) is done in a tank in which a fifth effluent fraction ($11^{th}$ stream) is decanted from the top and the impurities ($12^{th}$ stream) settle at the bottom of the tank and are removed by gravity.

The first solids fraction ($3^{rd}$ stream) is pressed in a first press which may be a screw press, an MD press or an oval press. The pressing produces a second solids fraction ($5^{th}$ stream) and a second effluent fraction ($4^{th}$ stream). The second solids fraction ($5^{th}$ stream) has percent solids in the range of 20 to 25% and thus has a higher solids concentration than the first solids fraction ($3^{rd}$ stream) which contains only about 5 to 15% solids. The second effluent fraction ($4^{th}$ stream) contains low solids (1-7%) and is fed into the first dissolved air flotation device along with the first effluent fraction ($2^{nd}$ stream).

The second solids fraction ($5^{th}$ stream) and the third solids fraction ($7^{th}$ stream) are combined to form the fourth solids fraction ($8^{th}$ stream). The fourth solids fraction ($8^{th}$ stream) along with the fifth solids fraction ($14^{th}$ stream) are fed into a second press which separates the fourth solids fraction ($8^{th}$ stream) and the fifth solids fraction ($14^{th}$ stream) streams into a sixth solids fraction ($9^{th}$ stream) that has solids in the range of about 30 to 40% by weight, and a fourth effluent fraction ($10^{th}$ stream) that is fed back into the first dissolved air flotation device along with the first effluent fraction ($2^{nd}$ stream) and the second effluent fraction ($4^{th}$ stream). The sixth solids fraction ($9^{th}$ stream) may be made into pallet or granulated form for use as animal feed. The second press may be a screw press, an MD press or an oval press.

Information on the cationic polyacrylamide, tannin and the anionic polyacrylamide which are used for the chemical treatments used in the process is provided below:

Tannin
  Molecular weight between 10,000 and 300,000
  Liquid form with 30 to 40% concentration
  Cationic site on the main chain
  Viscosity at 50% of between 40 and 2000 centipoises
  Comes in various forms such as tannic acid $C_{17}H_{16}O_9$ and gallic acid $C_7H_6O_5$.

In one embodiment of the present invention process, the tannin that is added to the third effluent fraction ($6^{th}$ stream) is modified by a Mannich reaction at a pH of between about 1 to about 2. The reaction involves the addition of 10% melamine formaldehyde or hexamine dissolved in water at a concentration of about 12.5%.

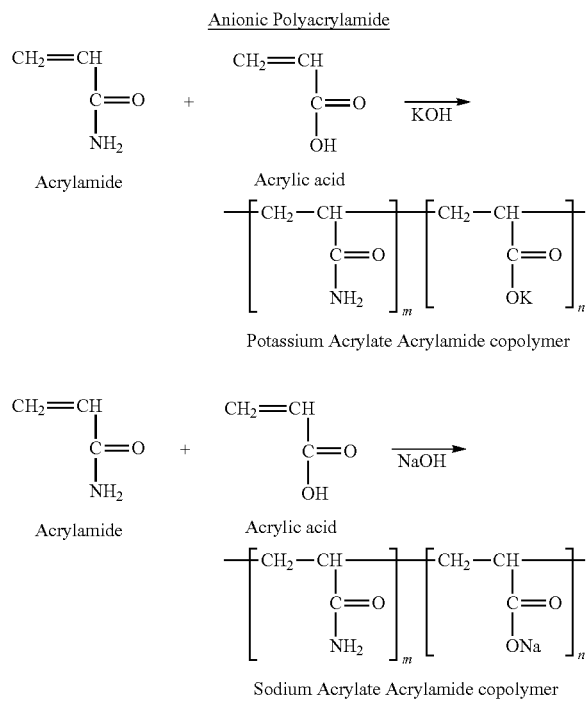

The anionicity of these copolymers can vary between 0% and 100% depending on the ratio of the monomers involved. The anionic copolymers used in the process of the present invention may have a molecular weight ranging between about 3 million to about 30 million, and a viscosity at a concentration of 5 g/l ranging from about 200 centipoises to about 2800 centipoises. The preferred pH range for making these copolymers is from 4.5 to 9.

Cationic Polyacrylamide Copolymer (ADMAEA)
Acrylamide-dimethylaminoethyl acrylate copolymers.
Cationic Polyacrylamide Copolymer.
The copolymerization of DMAEA-MeCl with acrylamide produces the cationic polymer
The Molecular weight: about 9 million to about 12 million in Dalton units.
Viscosity at 5 g/l: 1200 to 1700 cps.
Specifically: acrylamide/Ethanaminium, N,N,N-trimethyl-2-((1-oxo-2-propenyl)oxo)-, chloride copolymer is a useful form of ADMAEA in the present invention.

The molecular formula is $C_{11}H_{21}ClN_2O_3$.
60 to 80% charge

TABLE 1 below shows the estimated consistencies for each stream.

| Stream # | Stream name | Percent solids |
|---|---|---|
| First | Source waste stream | 1-10 |
| Second | First effluent fraction | 1-8 |
| Third | First solids fraction | 5-15 |
| Fourth | Second effluent fraction | 1-7 |
| Fifth | Second solids fraction | 20-25 |
| Sixth | Third effluent fraction | 1-4 |
| Seventh | Third solids fraction (from first DAF) | 10-15 |
| Eighth | Fourth solids fraction | 15-20 |
| Ninth | Sixth solids fraction | 30-40 |
| Tenth | Fourth effluent fraction | 1-8 |
| Eleventh | Fifth effluent fraction | 0.5-2 |
| Twelfth | Impurities | ND |
| Thirteenth | Sixth effluent fraction | 300-500 ppm |
| Fourteenth | Fifth solids fraction (from second DAF) | 5-13 |
| Fifteenth | Seventh effluent fraction | <100 ppm |
| Sixteenth | Impurities | ND |

I claim:

1. A process for separating water from a source stream containing water and non-aqueous matter, said process comprising:
   a. passing the source stream through a plate separator producing a first solids fraction and a first effluent fraction;
   b. passing the first solids fraction through a first press producing a second solids fraction and a second effluent fraction;
   c. passing the first effluent fraction into a first dissolved air flotation device, wherein the first effluent fraction is separated into a third solids fraction and a third effluent fraction, wherein separating the first effluent fraction into the third solids fraction and the third effluent fraction is accomplished by treating the first effluent fraction with acrylamide/Ethanaminium, N,N,N-trimethyl-2-((1-oxo-2-propenyl)oxo)-, chloride copolymer at about 5 ppm to 100 ppm by weight of the first effluent fraction;
   d. combining the second solids fraction with the third solids fraction to produce a fourth solids fraction;
   e. feeding the second effluent fraction into the first dissolved air flotation device;
   f. treating the third effluent fraction with about 100 to 5000 ppm by weight of solids of a demulsifier, then feeding the third effluent fraction into a mixing tank wherein the third effluent fraction is separated into a fifth effluent fraction and an impurities stream under mixing, said impurities stream being removed from the mixing tank by gravity while the fifth effluent fraction overflows a top of the mixing tank;
   g. following the demulsifier treatment, feeding the fifth effluent fraction into a flocculating tank wherein the fifth effluent fraction is treated with about 5 to 100 ppm by weight of a cationic polyacrylamide under mixing; and
   h. following the cationic polyacrylamide treatment, feeding the treated fifth effluent fraction into a second dissolved air flotation device, wherein the fifth effluent fraction is separated into a fifth solids fraction and a sixth effluent fraction.

2. The process of claim 1, further comprising feeding a combined fourth solids fraction and a fifth solids fraction through a second press to produce a fourth effluent fraction and a sixth solids fraction.

3. The process of claim 2, further comprising feeding the fourth effluent fraction into the first dissolved air flotation device.

4. The process of claim 2, wherein treating the first effluent fraction further comprises:
   (a) adding nitric acid at an amount of about 0.1 to 0.2% by weight of the first effluent fraction to a first chemical addition inlet disposed in a pipe leading to the first dissolved air flotation device,
   (b) adding between about 5 ppm to 50 ppm of anionic starch or anionic polyacrylamide by weight to a second chemical addition inlet disposed in the pipe leading to the first dissolved air flotation device, wherein a chemical addition at said second chemical addition inlet is configured to occur about 15 seconds after a chemical addition at the first chemical addition inlet based on an average volumetric flow rate through the pipe, and
   (c) adding about 100 to 500 ppm of a demulsifier by weight to a third chemical addition inlet disposed in the pipe leading to the first dissolved air flotation device, wherein a chemical addition at said third chemical addition inlet is configured to occur about 15 seconds after a chemical addition at the second chemical addition inlet based on an average volumetric flow rate through the pipe;
   wherein the third chemical addition inlet located in the pipe leading to the first dissolved air flotation device precedes a fourth chemical addition inlet, said fourth chemical addition inlet being used for the acrylamide/Ethanaminium, N,N,N-trimethyl-2-((1-oxo-2-propenyl)oxo)-, chloride copolymer treatment, wherein a chemical addition at said fourth chemical addition inlet is configured to occur about 15 seconds following a chemical addition at the third chemical addition inlet based on an average volumetric flow rate through the pipe.

5. The process of claim 4, further comprising passing the sixth effluent fraction through a reverse osmosis process to remove impurities to produce a seventh effluent fraction in a manner such that the seventh effluent fraction contains less than 100 ppm of impurities.

6. The process of claim 5, wherein the reverse osmosis process is carried out by a ceramic activated carbon membrane.

7. The process of claim 4, further comprising adjusting the addition amount of nitric acid such that a pH of the first effluent fraction ranges from about 7.0 to 7.25 if the source stream is raw manure and about 7.25 and 7.5 if the source stream is digested manure.

8. The process of claim 4, wherein the demulsifier is tannin.

9. The process of claim 8, wherein the tannin is modified to a Mannich polymer by the addition of 10% melamine formaldehyde or hexamine dissolved in water at a concentration of about 12.5%.

10. The process of claim 2, further comprising converting the sixth solids fraction into pellets or granules.

11. The process of claim 2, wherein the first press and second press is an oval press.

12. The process of claim 2, wherein the first press and second press is a multi-disc (an MD) press.

13. The process of claim 2, wherein the first press and second press is a screw press.

14. The process of claim 1, wherein the demulsifier is tannin.

15. The process of claim 14, wherein the tannin is modified to a Mannich polymer by the addition of 10% melamine formaldehyde or hexamine dissolved in water at a concentration of about 12.5%.

* * * * *